(12) United States Patent
Inatani et al.

(10) Patent No.: US 11,618,278 B2
(45) Date of Patent: Apr. 4, 2023

(54) MANUFACTURING METHOD OF VEHICLE WHEEL AND VEHICLE WHEEL

(71) Applicant: RAYS ENGINEERING CO., LTD., Osaka (JP)

(72) Inventors: Shujiro Inatani, Osaka (JP); Kazunori Ito, Osaka (JP); Tsutomu Hiromasa, Osaka (JP); Tomoyuki Murakami, Osaka (JP)

(73) Assignee: RAYS ENGINEERING CO., LTD, Osaka (JP)

( * ) Notice: Subject to any disclaimer, the term of this patent is extended or adjusted under 35 U.S.C. 154(b) by 0 days.

(21) Appl. No.: 17/107,978

(22) Filed: Dec. 1, 2020

(65) Prior Publication Data
US 2021/0260916 A1 Aug. 26, 2021

(30) Foreign Application Priority Data

Feb. 25, 2020 (JP) .............................. JP2020-029623

(51) Int. Cl.
*B60B 1/08* (2006.01)
*B21K 1/34* (2006.01)

(52) U.S. Cl.
CPC ................ *B60B 1/08* (2013.01); *B21K 1/34* (2013.01); *B60B 2310/202* (2013.01);
(Continued)

(58) Field of Classification Search
CPC . B60B 1/08; B60B 2310/60; B60B 2310/202; B60B 2310/208; B60B 2310/226; B60B 2310/228; B60B 2310/234; B60B 2310/616; B24B 9/00; B24B 9/002; B21K 1/34; B26B 27/005;
(Continued)

(56) References Cited

U.S. PATENT DOCUMENTS 6,997,787 B2 * 2/2006 Gatton ..................... C25D 5/44
205/183
2012/0056467 A1 * 3/2012 Hino ....................... B60B 3/10
301/95.102

FOREIGN PATENT DOCUMENTS

JP S63123603 A * 5/1988 ............... B23D 5/00
JP 2007-106285 4/2007
JP 2016-037061 3/2016

OTHER PUBLICATIONS

Machine Translation for JPS63123603A (Year: 1988).*

* cited by examiner

*Primary Examiner* — David P Bryant
*Assistant Examiner* — Christine Bersabal
(74) *Attorney, Agent, or Firm* — Amin, Turocy & Watson, LLP

(57) ABSTRACT

A method for manufacturing a vehicle wheel of the present invention includes a step of performing an edge treatment including deburring of a spoke edge generated by lathe processing. For the edge treatment, a cutting tool as hale type tool for non-rotational processing is used, and the cutting tool is provided with a processing blade having a recessed blade edge having an R shape or polygonal C shape protruding from an outer peripheral surface on a side of a tip end of the rod-shaped cutting tool connected to a rod-shaped shank portion. A processing machine capable of CNC of four or more axes is used. With the cutting tool standing upright against a disc surface, the blade edge of the processing blade is applied to the spoke edge, and the cutting tool is continuously moved relative to the spoke edge along a ridgeline of the spoke edge for scraping.

11 Claims, 22 Drawing Sheets

(52) U.S. Cl.
CPC ... *B60B 2310/208* (2013.01); *B60B 2310/226* (2013.01); *B60B 2310/228* (2013.01); *B60B 2310/60* (2013.01); *B60B 2310/616* (2013.01)

(58) Field of Classification Search
CPC ...... B23D 15/10; B23D 19/08; B23D 61/021; B23D 61/04; B23D 5/00–04; B23D 79/02; A47L 13/08; B25D 3/00; B28D 1/121
USPC .......... 30/167, 167.1, 168, 169, 172, 2, 278, 30/279.2; 83/835, 837, 839
See application file for complete search history.

polygonal C-shaped
(two surfaces)

polygonal C-shaped
(three surfaces)

C-shaped
(one surface)

portion A cross-sectional photograph
(magnification of 50 times )

portion A cross-sectional photograph
(magnification of 500 times)

portion B cross-sectional photograph
(magnification of 50 times )

portion B cross-sectional photograph
(magnification of 500 times)

portion C cross-sectional photograph
(magnification of 50 times )

portion C cross-sectional photograph
(magnification of 500 times)

portion D cross-sectional photograph
(magnification of 500 times)

MANUFACTURING METHOD OF VEHICLE WHEEL AND VEHICLE WHEEL

BACKGROUND OF THE INVENTION

Field of the Invention

The present invention relates to a method for manufacturing a vehicle wheel and a vehicle wheel, and more particularly to an edge treatment technique for forming a good coating film on a spoke edge.

Description of the Related Art

A vehicle wheel manufactured by casting or forging includes a cylindrical rim portion for mounting a tire and a disc portion provided with pluralities of spokes and decorative holes. In general, since a vehicle wheel requires dimensional accuracy in both a casting method and a forging method, after a cast or forged material is molded, lathe processing and machine processing using a machining center are performed. These processes are performed by rotating a wheel molded body to be a workpiece or a cutting tool. For example, burrs are generated on a spoke edge by lathe processing on a front surface (design surface) and a back surface of the disc portion. The spoke edge is a corner of a boundary between the front surface and a side surface of the spoke, and a corner of a boundary between the back surface and the side surface of the spoke. Burrs are generated especially on a pull-out side of a blade due to lathe processing.

Burrs hinder safety when handling a vehicle wheel, and even small hair burrs cause corrosion because a coating film in a coating process becomes thin or no coating film is formed at the burrs. On the other hand, depending on the edge angle, the three-dimensional line shape, and the like, it is difficult to form a coating film on the spoke edge with a sufficient film thickness including a powder primer layer in the coating process, and final coating capable of ensuring sufficient rust prevention performance may not be provided.

Therefore, conventionally, edge treatment of the spoke edge is performed before the coating process is carried out. The edge treatment is usually manually performed. For example, an operator holds by hand a rotary tool such as a Leutor or a belt sander that performs polishing while rotating a polishing belt, and moves the tool along a spoke edge to remove burrs generated by lathe processing and to finish a C surface. Next, the operator manually removes secondary burrs generated by the rotary tool such as a Leutor using sandpaper or a non-woven fabric to perform a final finishing treatment (Japanese Patent Laid-Open No. 2007-106285 [0022], [0023] etc.).

SUMMARY OF THE INVENTION

However, during a manual edge treatment, if a space between spokes is narrow due to the size and shape of each tool and the product design, it is difficult to deburr the spoke edge and process the C surface properly due to interference between the tool and the product. In addition, the manual edge treatment is likely to cause processing variations such as shallowness (insufficient cutting) and deepness (overcutting) with respect to a spoke edge having a three-dimensional line shape. Furthermore, new secondary burrs are generated by a rotary tool, so that it is necessary to perform a final finishing treatment to remove the burrs, and thus a plurality of processing steps is required. As described above, there is a limit to the manual edge treatment, the finished quality varies, the edge treatment takes time and effort, and the cost is high.

The present invention has been made in view of the above circumstances, and an object of the present invention is to provide a method for manufacturing a vehicle wheel and a vehicle wheel such that an edge treatment of a spoke edge does not cause variations as in the case of manual work, deburring and formation of a C surface or an R surface can be stably and efficiently performed, and a stable coating film can be secured on the spoke edge by a coating process.

A method for manufacturing a vehicle wheel according to the present invention is a method for manufacturing a vehicle wheel having a cylindrical rim portion for mounting a tire and a disc portion provided with pluralities of spokes and decorative holes, and manufactured by casting or forging, the method including performing lathe processing of the disc portion, and an edge treatment including removal of burrs at a spoke edge generated by the lathe processing, in which during the edge treatment, using a cutting tool as hale type tool for non-rotational processing having a processing blade with an R-shaped or polygonal C-shaped recessed blade edge protruding from an outer peripheral surface on a side of a tip end of a rod-shaped cutting tool connected to a rod-shaped shank portion, with a processing machine that allows relative movement of the cutting tool with respect to the spoke edge having a three-dimensional line shape by computerized numerical control (CNC) of four or more axes, the cutting tool is standing upright against a disc surface while holding a tool rotation direction angle within a range that allows transferring of a shape of the R-shaped or polygonal C-shaped blade edge of the cutting tool, the blade edge of the processing blade is applied to the spoke edge and continuously moved relative to the spoke edge along a ridgeline of the spoke edge for scraping so that burrs are removed from the spoke edge, and at the same time, a processed surface having a uniform R shape or polygonal C shape that matches the shape of the blade edge of the cutting tool is continuously formed, and a coating film can be stably formed on the processed surface of the spoke edge in a subsequent coating process.

Further, a vehicle wheel according to the present invention is a vehicle wheel that is coated and includes a cylindrical rim portion for mounting a tire and a disc portion provided with pluralities of spokes and decorative holes, the vehicle wheel including a configuration such that by a cutting tool as hale type tool for non-rotational processing having a processing blade with an R-shaped or polygonal C-shaped recessed blade edge, using a processing machine capable of CNC of four axes or more, burrs are removed from a spoke edge of each of the spokes that has been processed with a lathe and a processed surface having a uniform R shape or polygonal C shape matching a shape of the blade edge of the cutting tool is continuously formed over an ridgeline of the spoke edge.

According to the present invention, an edge treatment of a spoke edge does not cause variations as in the case of manual work, and removing burrs generated by lathe processing and formation of a C surface or an R surface on the spoke edge can be stably and efficiently performed. On a processed surface of the spoke edge, a formation of a stable coating film having an appropriate film thickness can be secured by a coating process. As a result, it is possible to sufficiently secure rust preventive performance even at the spoke edge for a long period of time.

DETAILED DESCRIPTION OF THE PREFERRED EMBODIMENT

Hereinafter, an embodiment of the present invention will be described.

Figure 1:
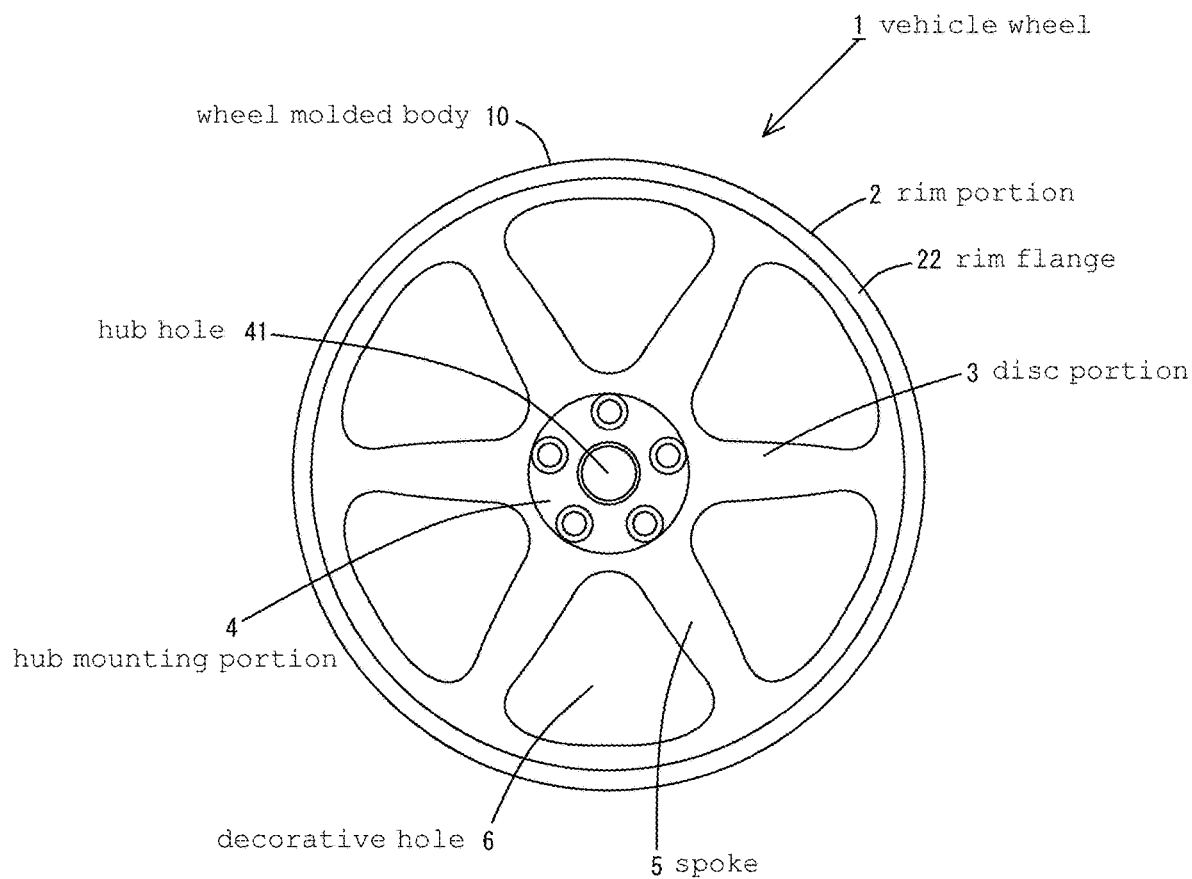
FIG. 1 is a front view showing a vehicle wheel of an embodiment.
Figure 2:
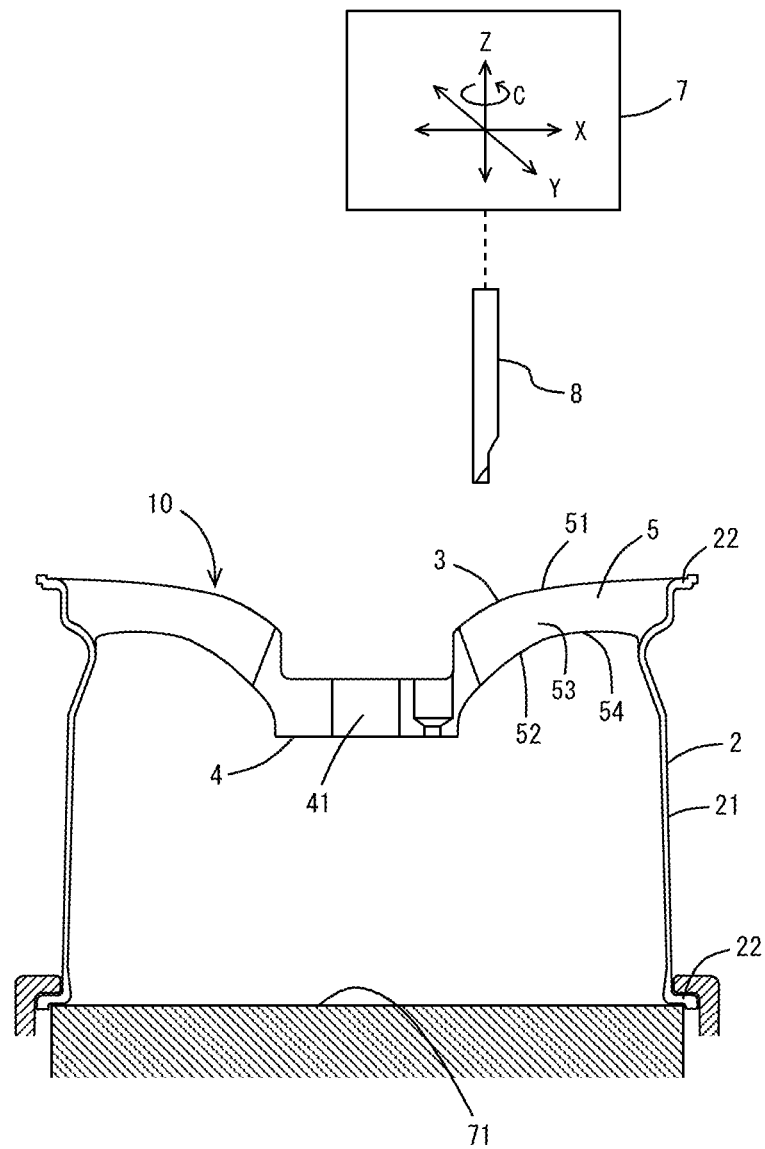
FIG. 2 is a schematic cross-sectional view showing the vehicle wheel of the embodiment.

As shown in FIGS. 1 and 2, a vehicle wheel 1 of the present embodiment is made of a light alloy such as an aluminum alloy, and is formed from a wheel molded body 10 obtained by molding a material manufactured by casting or forging. The vehicle wheel 1 includes a cylindrical rim portion 2 for mounting a tire, and a disc-shaped disc portion 3 provided with pluralities of spokes 5 and decorative holes 6. In addition, an entire surface of the vehicle wheel 1 is coated. The present invention can be applied regardless of the material of the vehicle wheel 1, and can be applied to either an integral or divided structure of the rim portion 2 and the disc portion 3.

The rim portion 2 includes a cylindrical portion 21 and rim flanges 22 (outer side and inner side) provided at both ends of the cylindrical portion 21. The disc portion 3 is provided with a hub mounting portion 4 provided with a hub hole 41 for fitting with a vehicle hub in a central portion, and the pluralities of spokes 5 and decorative holes 6 are provided between the hub mounting portion 4 and the rim portion 2. An inset structure is applied and the disc portion 3 is arranged closer to an outer side of the rim portion 2, but the present invention is not limited to this, and a zero-set or outset structure may be applied.

A design surface of the vehicle wheel 1 is a portion on a surface side of the disc portion 3 and the rim portion 2 that can be seen from the outside when the vehicle wheel 1 is mounted on a vehicle. This design surface has a three-dimensional shape, and has various three-dimensional shapes such as an R shape, a square shape, a projecting shape, and a recessed shape. Each spoke 5 has a generally quadrangular prism shape, and has various three-dimensional shapes depending on the product design. A front surface 51 of the spoke 5 has various three-dimensional shapes such as an R surface, a projecting surface, and a recessed surface as well as a flat curved surface, whereas a back surface 52 of the spoke 5 often has a flat curved surface (including a surface having a recessed portion in the middle).

On a side of the back surface 52 of the spoke 5, a spoke edge 54 that is a boundary between the back surface 52 and a side surface 53 of the spoke 5 has an angular shape, and a ridgeline of the spoke edge 54 has various three-dimensional line shapes (line shapes extending into three-dimensional space) such as a curved, straight, or composite line depending on the spoke shape. On a side of the front surface 51 of the spoke 5, an angular spoke edge is formed at a boundary between the front surface 51 and the side surface 53 of the spoke 5 depending on the product design.

In a manufacturing process of the vehicle wheel 1, the wheel molded body 10 after a casting material or a forging material is molded by either casting or forging is processed with a lathe and machined by a machining center in order to obtain dimensional accuracy. Burrs are formed on the spoke edge 54 by lathe processing on a front surface and a back surface of the disc portion 3. In the present embodiment, the spoke edge 54 after lathe processing is subjected to an edge treatment including removing of the burrs generated by lathe processing using a hale type tool (spring-necked tool) 8 as a cutting tool for non-rotational processing by a processing method similar to a hale processing method using a processing machine 7 of four or more axes. By the edge treatment, the spoke edge 54 has a processed surface 55 having a uniform R shape or polygonal C shape that substantially matches a shape of the blade edge of the hale type tool 8 (see FIGS. 8A to 8D) that is continuous over an entire length of the ridgeline of the spoke edge 54 ridgeline. As a result, the spoke edge 54 that has been edge-treated is stably coated with a coating film having an appropriate film thickness by a subsequent coating process.

The edge treatment will be described below.

An edge treatment method here is, for example, a processing method similar to shaving or hale processing of a wood, but shaving or the like is processing only on a two-dimensional plane, and the edge treatment is a method of cutting the spoke edge 54 having a three-dimensional line shape. That is, the edge treatment is performed using the processing machine 7 capable of computerized numerical control (CNC) of four or more axes by using the hale type tool 8 for non-rotational processing. In the present embodiment, the edge treatment for the spoke edge 54 on a side of the spoke back surface 52 will be mainly described.

The hale type tool 8 used for the edge treatment is a cutting tool for non-rotational processing. Unlike a rotary tool such as an end mill, this is a tool that cuts a material without being rotated. The hale type tool 8 does not perform processing on a two-dimensional plane, but has a configuration suitable for cutting on the spoke edge 54 having a three-dimensional line shape.

As shown in FIGS. 3A to C, and 4, the hale type tool 8 is made of metal, ceramic, or the like, and has a cylindrical rod-shaped shank portion 81 with a base end that is attached to a spindle of the processing machine 7, and a processing blade 82 that is formed so as to protrude from an outer peripheral surface 86 of a tip end of the rod-shaped tool and performs the edge treatment on the spoke edge 54. A shank diameter (R radius) of the shank portion 81 is formed to be smaller than an R radius of a corner having a minimum R in each decorative hole 6 between the adjacent spokes 5. As a result, the processing blade 82 of the hale type tool 8 can be reliably applied to a spoke edge end located at the corner of the decorative hole 6.

The processing blade 82 is integrally formed with the shank portion 81. The processing blade 82 is formed with a processing blade surface 84, and the processing blade surface 84 is a rake face continuous with a cutout surface 85 formed by cutting out a tip end portion of the shank portion 81 along an axial direction. A blade edge 83 is formed, in the processing blade 82 protruding from the outer peripheral surface 86 of the shank portion 81, toward a side of the base end of the shank portion 81. That is, when the hale type tool 8 is placed upright with the side of the base end of the shank portion 81 facing up, an upper end portion of the processing blade 82 is the blade edge 83. As a result, during the edge treatment of the spoke edge 54 on the side of the spoke back surface 52, the hale type tool 8 is inserted into the decorative hole 6 from a side of the front surface of the disc portion 3, so that the blade edge 83 of the processing blade 82 is applied to the spoke edge 54 on the side of the back surface to perform the edge treatment. Therefore, in the vehicle wheel 1 having an inset structure, that is, the disc portion 3 being arranged on an outer side of the rim portion 2, the side of a disc front surface with the low rim portion 2 and the hale type tool 8 is inserted from the side of the disc front surface, so that the hale type tool 8 does not interfere with the rim portion 2 and thus the edge treatment can be reliably performed on the spoke edge 54 on the side of the spoke back surface 52.

An inclination angle $\alpha$ is formed on the processing blade surface 84. When the processing blade surface 84 is a front surface, a side of the tip end of the shank portion 81, that is, a side opposite the blade edge 83 on the processing blade surface 84 is inclined backward (see FIG. 3B). As a result, the blade edge 83 facing the side of the base end of the shank portion 81 has a positive rake angle set on the spoke edge 54 perpendicular to an axis of the shank portion 81, and cutting resistance is low and the processed surface 55 can be finished to be a smooth surface. The processing blade surface 84 may have an inclination angle that allows inclination of the side of the tip end of the shank portion 81 forward, or the processing blade surface 84 may be formed parallel to the axis of the shank portion 81 without having the inclination angle $\alpha$.

Figure 8A:
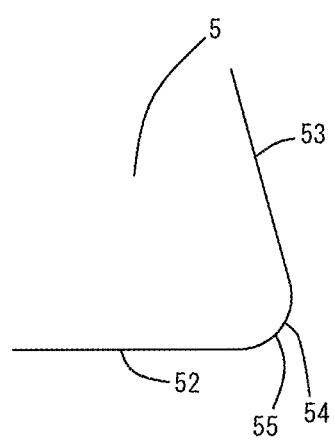
FIG. 8A is a schematic cross-sectional diagram showing a spoke edge having an R-shaped processed surface.
Figure 8B:
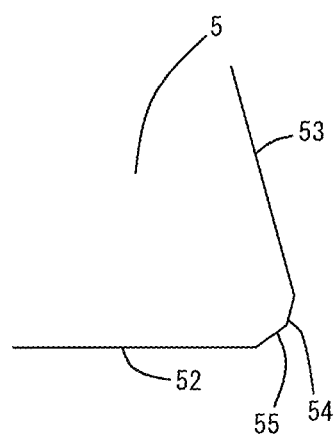
FIG. 8B is a schematic cross-sectional diagram showing the spoke edge having a polygonal C-shaped processed surface with two surfaces.
Figure 8C:
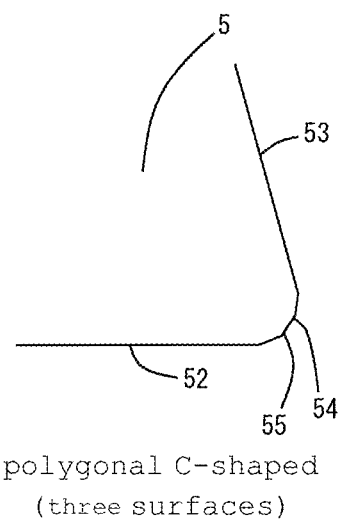
FIG. 8C is a schematic cross-sectional diagram showing the spoke edge having a polygonal C-shaped processed surface with three surfaces.
Figure 8D:
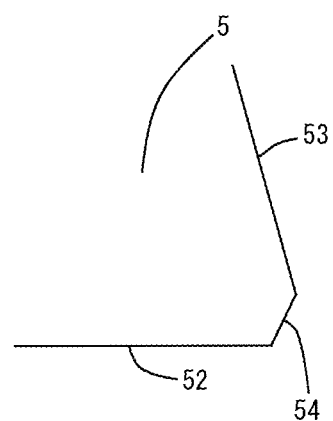
FIG. 8D is a schematic cross-sectional view the spoke edge having a C-shaped processed surface with one surface.

The blade edge 83 has an R-shaped recessed shape. Accordingly, the blade edge 83 is applied to the spoke edge 54 and continuously moved relative to the spoke edge 54 along the ridgeline for scraping. As a result, burrs generated by lathe processing are removed from the spoke edge 54 and new burrs are prevented from being generated, and the processed surface 55 having a uniform R shape that matches a shape of the blade edge 83 is continuously formed (see FIG. 8A). A coating film having an appropriate film thickness can be stably formed on the processed surface 55 having an R shape in the coating process. The shape of the blade edge 83 is not limited to the R-shaped recessed shape, and may be a polygonal C-shaped recessed shape having two or more corners. In this case, an angle at which two straight lines of the polygonal C shape intersect is set to an obtuse angle, and is preferably an obtuse angle of 100° or more. Even with the hale type tool 8 having a blade edge having a polygonal C shape, burrs generated by lathe processing are removed from the spoke edge 54 and new burrs are prevented from being generated, and the processed surface 55 having a uniform C shape that matches the shape of the blade edge is continuously formed (see FIGS. 8B and 8C). Regarding the processed surface 55 having a C surface, in a C surface finish with one C surface as shown in FIG. 8D, a coating film having an appropriate film thickness may not be formed at sharp corners at both ends of the C surface in the coating process. In the case of a polygonal C surface having two or more surfaces as shown in FIGS. 8B and 8C, corners at edges of each C surface are relatively smooth, and a coating film having an appropriate film thickness can be stably formed in the coating process.

The blade edge 83 is formed so that a line of the R-shaped recessed shape inclines toward the tip end portion of the shank portion 81 from the outer peripheral surface 86 of the shank portion 81 toward the outside. That is, when the hale type tool 8 is placed vertically with respect to a disc surface (extending surface of the disc portion 3) and the blade edge 83 is applied to the spoke edge 54 on the side of the spoke back surface 52, the shape of the blade edge matches the shape of the processed surface 55 of the spoke edge 54.

Figure 5:
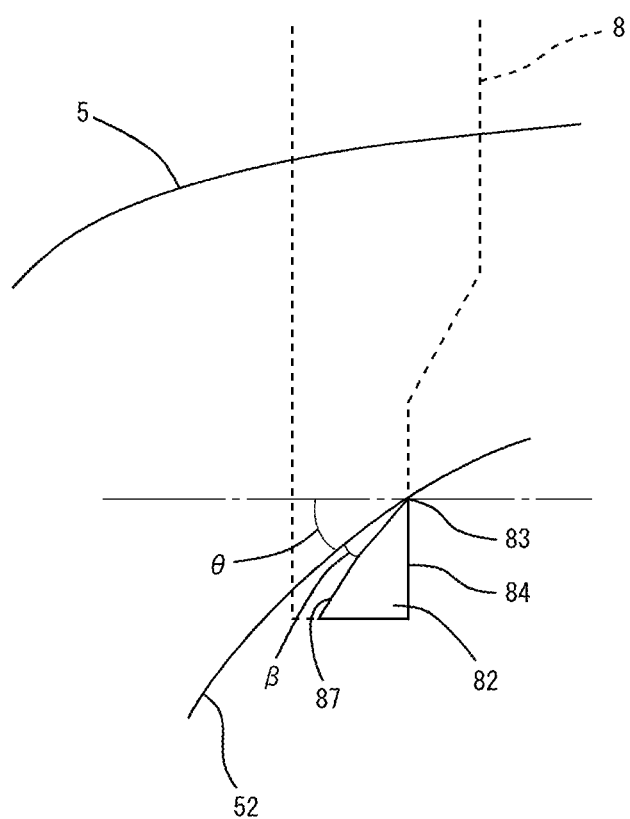
FIG. 5 is a schematic diagram for explaining a rising angle of a back surface of a spoke and a clearance angle of the processing blade of the hale type tool.

Further, when the vehicle wheel 1 is placed horizontally with a side of the design surface facing upward, as shown in FIG. 5, a side of a disc center of the spoke back surface 52 forms an inclined surface that rises toward a side of a disc outer diameter and has a predetermined rising angle $\theta$ with respect to a horizontal line. When the processing blade surface 84 faces the side of the disc outer diameter and the blade edge 83 is applied to the spoke edge 54 on the side of the spoke back surface 52 while the hale type tool 8 is placed vertically with respect to the disc surface, the processing blade 82 has such a shape that a clearance angle $\beta$ equal to or greater than the rising angle $\theta$ of the spoke back surface 52 is secured.

Therefore, when the hale type tool 8 is inserted from the side of the design surface and the edge treatment is performed on the spoke edge 54 on the side of the spoke back surface 52, even when the hale type tool 8 is held in a vertical position with respect to the disc surface, a flank 87 (back surface) of the processing blade 82 has an inclined surface on the spoke back surface 52, and the edge treatment can be performed without causing the hale type tool 8 to interfere with the spoke back surface 52. If the edge treatment can be performed while the hale type tool 8 is in an upright position, it is possible to omit control of a rotation axis around each of an X-axis (A-axis) and Y-axis (B-axis) with respect to the hale type tool 8. Therefore, a processing control program for controlling an operation of the processing machine 7 can be easily configured, and the processing machine 7 can be supported by the processing machine 7 capable of controlling at least four axes of XYZC axes. The present invention is not limited to performing the edge treatment with the hale type tool 8 in an upright position, and the hale type tool 8 may be moved along the spoke edges 54 while adjusting an inclination with respect to the Z-axis.

Two processing blades 82 are formed, and each processing blade 82 is formed on right and left sides at a height position orthogonal to the axis of the shank portion 81. The processing blade surface 84 of each processing blade 82 is continuously formed on the cutout surface 85 of the shank portion 81 and faces in the same direction. In this case, during the edge treatment of the spoke edge 54 on the side of the spoke back surface 52, the processing blade 82 on one side can process the spoke edge 54 on one side of the left and right side surfaces 53 of the spoke 5, and the processing blade 82 on another side can process the spoke edges 54 on another side of the left and right side surfaces 53 of the spokes 5 (see FIG. 7). As a result, the hale type tool 8 can be moved relatively in one direction from the side of the disc center to the side of the disc outer diameter or from the side of the disc outer diameter to the side of the disc center. Therefore, a processing control program that controls the operation of the processing machine 7 can be easily configured, and the control of the processing machine 7 can be simplified. In addition to the above two, one or more processing blades 82 may be formed at appropriate positions.

Unlike a normal machining center, the processing machine 7 that is used does not have only a spindle function that causes the spindle to constantly rotate a rotary tool. In the processing machine 7, the spindle functions as a C-axis that allows an angle adjustment of the spindle around the axis, and the processing control program for moving the hale type tool 8 along the ridgeline of the spoke edge 54 having a three-dimensional line shape controls a position of the hale type tool 8 and moves the hale type tool 8 relative to the wheel molded body 10 as a workpiece.

The processing machine 7 is equipped with four or more moving axes, and uses a device to move each axis with ultra-precision (for example, in μm units) under CNC based on three-dimensional shape data of the spoke edge 54. For example, the processing machine 7 uses a device capable of controlling four axial positions: a linear feed in three axial directions orthogonal to each other on the X-axis, Y-axis, and Z-axis, and a rotary feed that adjusts an angle around the Z-axis, which is an C-axis as a fourth axis. In addition to the above four axes, a device can also be used capable of position control of five or six axes that allows an angle adjustment of the A axis (around the X axis) and/or the B axis (around the Y axis).

Position control of four or more axes is relatively performed between the spindle and the bed 71, and the hale type tool 8 is attached to the spindle and the wheel molded body 10 as the workpiece is attached to the bed 71. For example, a configuration is adopted such that the bed 71 is on a fixed side and the position of the spindle is controlled on four or more axes, but the present invention is not limited to this, and a configuration may be adopted such that the positions of some or all of the axes can be controlled on a side of the bed 71.

The bed 71 can use a rotary table that allows rotational movement of the wheel molded body 10 around an center axis of wheel rotation so that the spoke 5 to be processed can be indexed so as to be positioned below the hale type tool 8.

The bed 71 may be capable of moving in the XYZ axis directions as needed, in addition to the rotational movement for indexing.

Further, the processing machine 7 may be provided with an automatic tool changer (ATC) so that the hale type tool 8 can be automatically replaced and attached. In this case, the same processing machine 7 can be used to perform rough cutting of an outer shape of the wheel molded body 10 and hole processing of the wheel molded body 10 with a normal rotary tool (for example, end mill, drill, etc.), and a plurality of machines does not have to be used. Therefore, the vehicle wheel 1 can be manufactured efficiently and economically.

The processing machine 7 used in the present invention is not limited to a dedicated machine. For example, a machining center may be used that has been modified so that the position of the spindle for attaching a tool can be controlled in a rotation direction around the Z axis without free rotation and be firmly fixed at a predetermined position, or an articulated robot that moves in directions of four or more axes of the XYZC axes may be used.

Then, in order to perform the edge treatment of the spoke edge 54 by the hale type tool 8 and the processing machine 7, the hale type tool 8 is attached to the spindle of the processing machine 7, and the wheel molded body 10 after lathe processing is attached to the bed 71. The bed 71 has a horizontal mounting surface, and the wheel molded body 10 is mounted on the bed 71 with the side of the design surface facing up. The spindle is arranged above the bed 71, and the hale type tool 8 attached to the spindle is arranged in an upright position with the axis oriented in the vertical direction. Then, after operating the processing machine 7 and indexing the wheel molded body 10 so that the spoke 5 to be processed is arranged at a tool position, the hale type tool 8 is oriented with its axis in an upright position perpendicular to the disc surface and inserted into the decorative hole 6 from the side of the design surface. The hale type tool 8 is brought closer to the spoke side surface 53, and the blade edge 83 of the hale type tool 8 is abutted against a spoke edge end on a side of a wheel center side with respect to the spoke edge 54 on the side of the spoke back surface 52.

Figure 6:
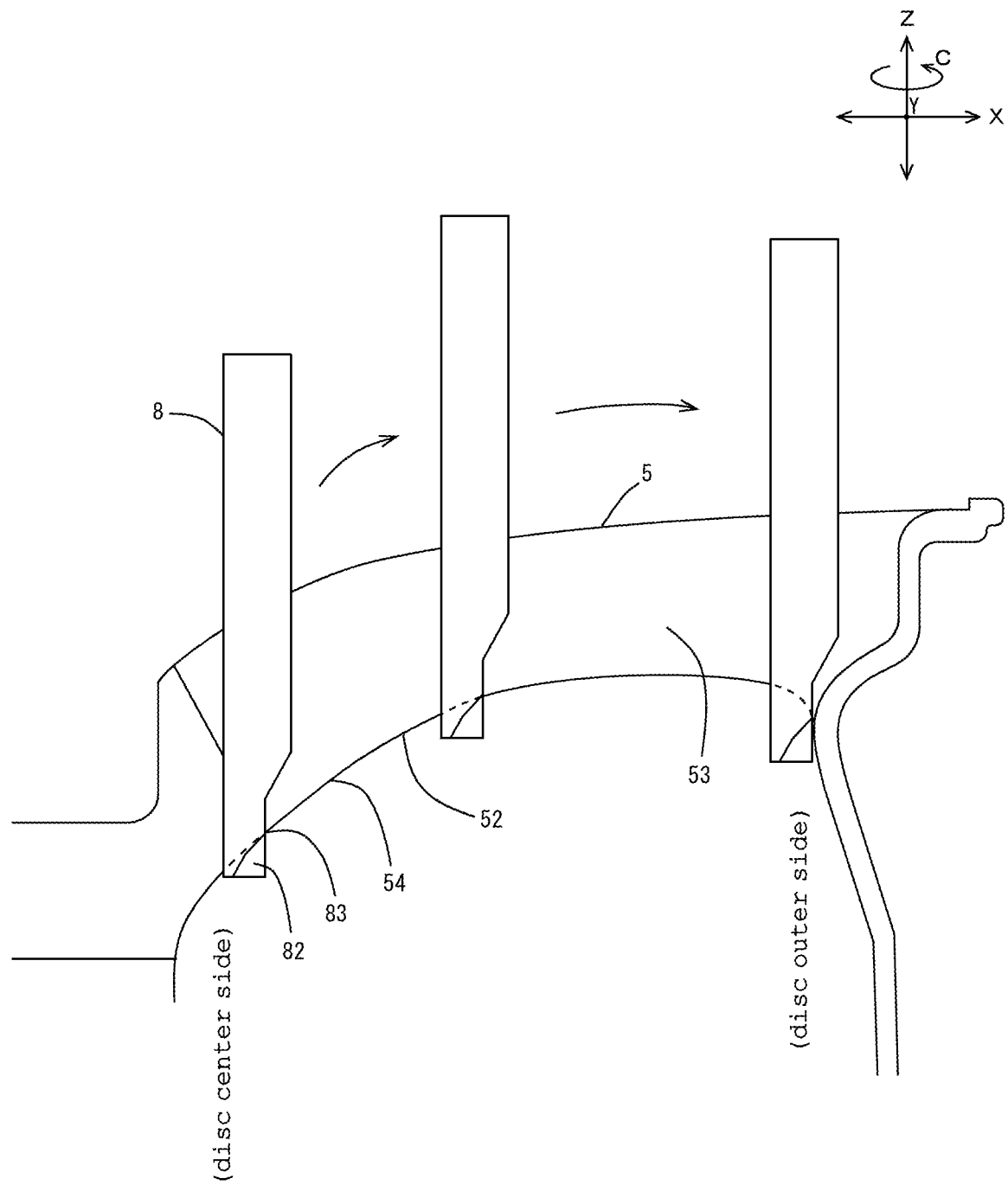
FIG. 6 is a schematic diagram of a side surface of the spoke for explaining an edge treatment process.
Figure 7:
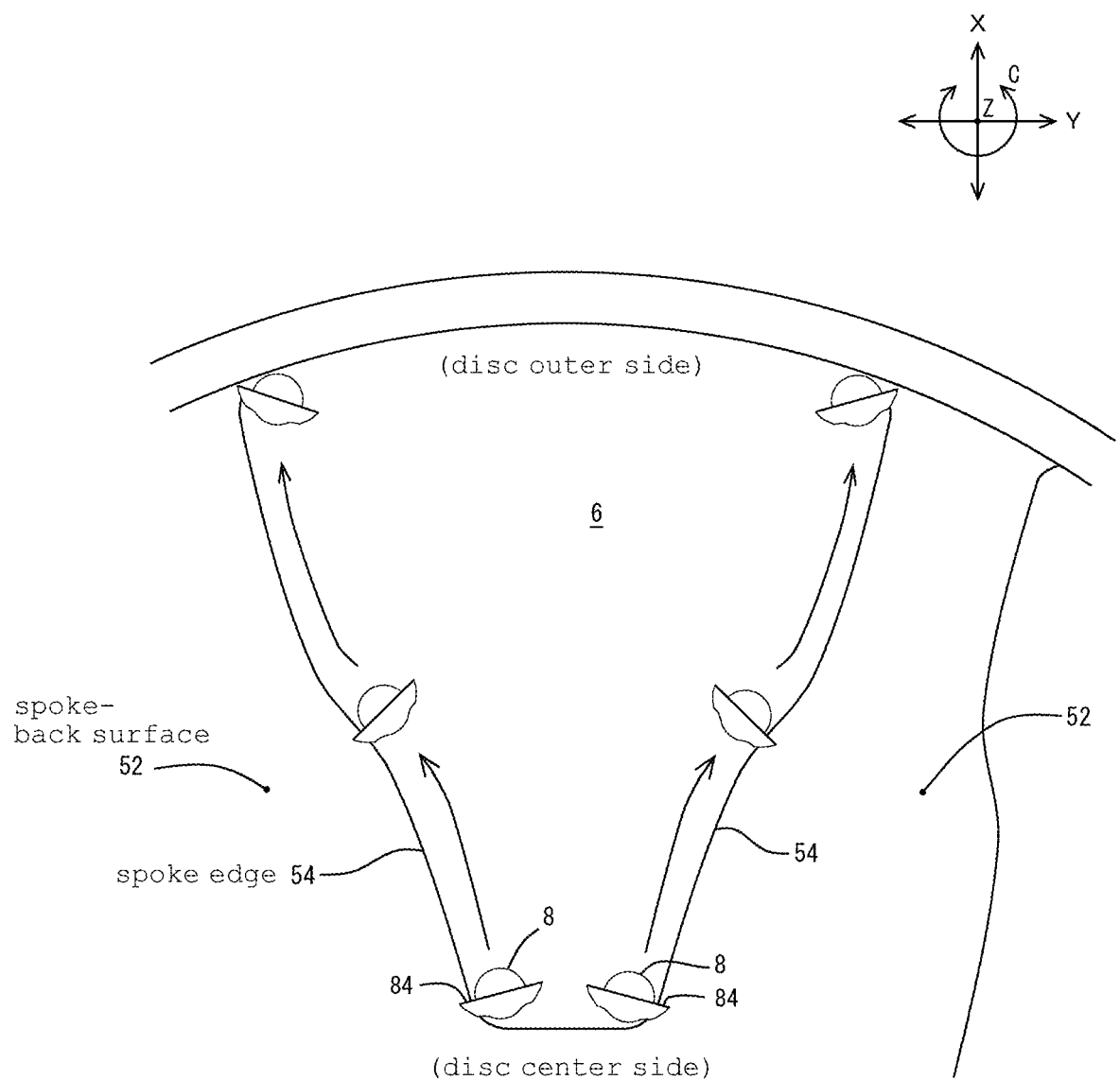
FIG. 7 is a schematic diagram of a back surface of the spoke for explaining the edge treatment process.

Based on the three-dimensional shape data of the spoke edge 54 input in advance, by CNC, the processing machine 7 holds a tool rotation direction angle within a range that allows transferring of the R-shaped blade edge shape of the hale type tool 8, and continuously moves the hale type tool 8 from the spoke edge end on the side of the disc center to the spoke edge end on the side of the disc outer diameter while controlling the position of the hale type tool 8 with ultra-precision, and performs the edge treatment for deburring and chamfering the spoke edge 54 having a three-dimensional line shape at the same time. At this time, as shown in FIGS. 6 and 7, while the hale type tool 8 is kept in the vertical position, an angle is adjusted so that the processing blade surface 84 faces the direction of the ridgeline of the spoke edge 54 (tool traveling direction) by an angle command around the Z axis, which is the C axis, and the hale type tool 8 is moved so that the blade edge 83 follows the ridgeline of the spoke edge 54 having a three-dimensional line shape by an axial position command of the XYZ axes. As a result, burrs generated by lathe processing at the spoke edge 54 are removed and sharp edges are scraped.

In the present embodiment, during the edge treatment of the spoke edge 54 on the side of the spoke back surface 52, the hale type tool 8 is moved from the side of the disc center to the side of the disc outer diameter in one direction. In this case, one of the two processing blades 82 of the hale type tool 8 is used to process the spoke edge 54 on one of the left and right side surfaces 53 of the spoke 5, and the other one of the processing blades 82 processes the spoke edge 54 on the other one of the left and right side surfaces 53 of the spoke 5 (see FIG. 7). The hale type tool 8 may be moved from the side of the disc outer diameter to the side of the disc center in one direction. Further, the hale type tool 8 may be moved so as to orbit the decorative hole 6, but in this case, with respect to the spoke edge 54 of each of the two adjacent spokes 5 forming the decorative hole 6, one of the two processing blades 82 of the hale type tool 8 is used to perform processing.

By the above edge treatment, burrs are removed, and the processed surface 55 having a uniform R or polygonal C shape that matches the shape of the blade edge of the hale type tool 8 is continuously formed at the spoke edge 54. On the processed surface 55 of the spoke edge 54, a coating film having an appropriate film thickness can be stably formed in the subsequent coating process. By the coating process, a coating film is formed by forming a primer layer, a basic color coat layer, and a clear coat layer in this order on a metal base of the wheel molded body 10, and the product is completed.

From the above, according to the edge treatment of the present embodiment, it is possible to remove burrs generated by lathe processing and to form the processed surface 55 having a uniform R shape or polygonal C shape at the spoke edge 54. In the edge treatment, no new burrs are generated on the processed surface 55 of the spoke edge 54, so that the final finishing treatment with sandpaper, non-woven fabric, or the like as in the case of the conventional manual work is unnecessary. As described above, according to the edge treatment, while burrs generated by lathe processing on the spoke edge 54 can be removed, it is possible to stably form a shape of the processed surface 55 having a uniform R shape or polygonal C shape with excellent corrosion resistance in one process without requiring a plurality of processing steps even on the spoke edge 54 having a complicated shape having a three-dimensional line shape. As a result, time saving and cost reduction can be achieved. Further, by the subsequent coating process, a coating film having an appropriate film thickness can be stably formed on the processed surface 55 of the spoke edge 54. Therefore, the spoke edge 54 can have a final coating that can sufficiently secure rust preventive performance.

Next, according to the present invention, a vehicle wheel 1 with the spoke edge 54, on the side of the spoke back surface 52, which has been edge-treated is prototyped, and the shape of the processed surface 55 of the spoke edge 54 and a state of the coating film are evaluated.

Figure 3A:
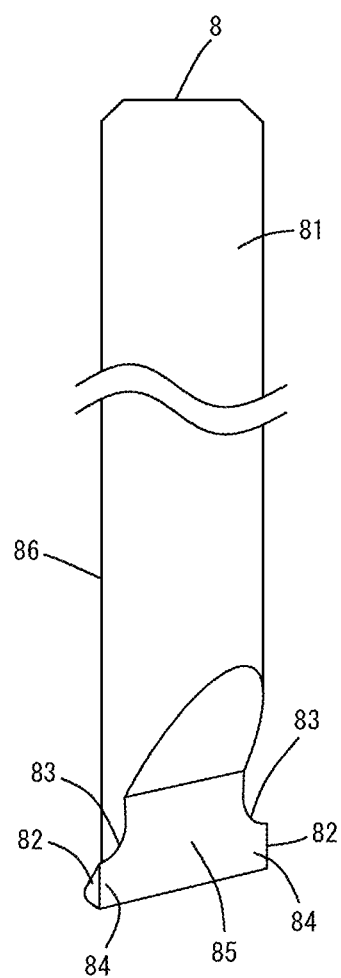
FIG. 3A is a perspective view of a side of a processing blade of a hale type tool.
Figure 3B:
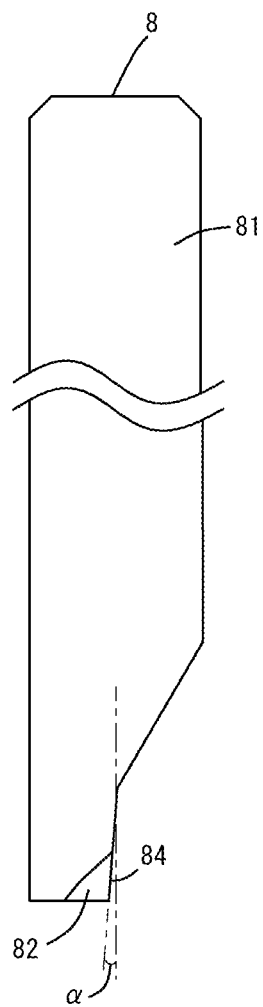
FIG. 3B is a side view of the hale type tool.
Figure 3C:
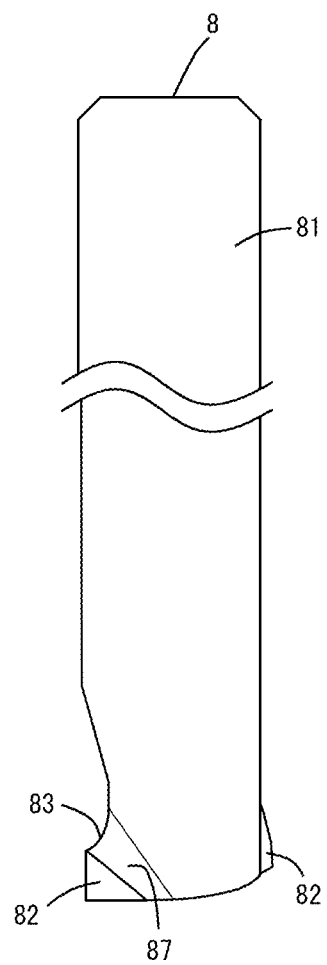
FIG. 3C is a perspective view of a back side of the processing blade of the hale type tool.
Figure 4:
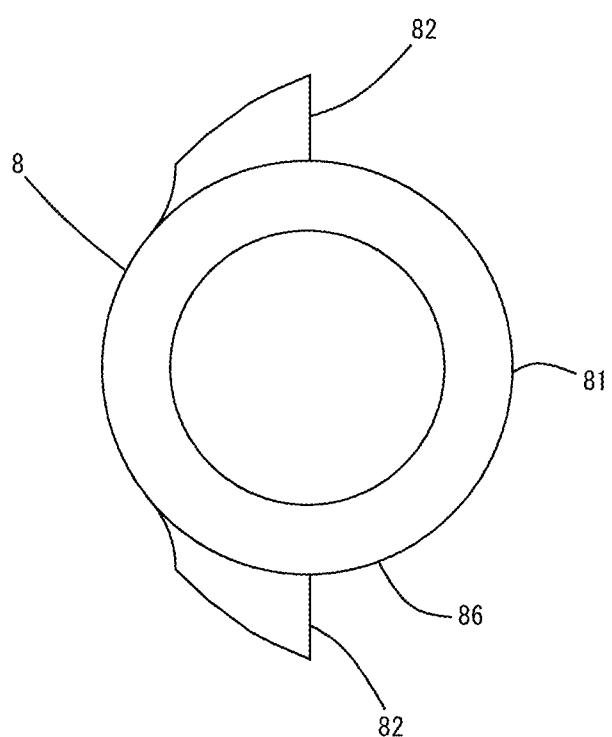
FIG. 4 is a top view of the hale type tool.
Figure 9:
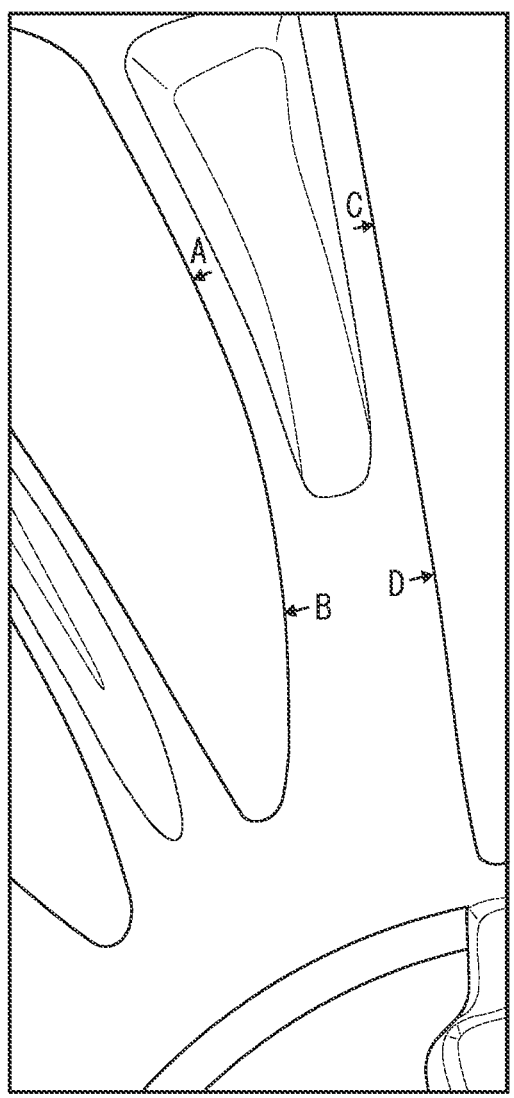
FIG. 9 is a photograph showing a back surface of a spoke of a vehicle wheel prototyped according to the present invention.

The prototype vehicle wheel 1 is manufactured by casting an aluminum alloy, and after lathe processing of the disc portion 3, using the four-axis control processing machine 7, the hale type tool 8 having the blade edge 83 shown in FIGS. 3A to 3C having an R-shaped recessed shape is inserted from the side of the design surface so as to perform the edge treatment on the spoke edge 54 on the side of the spoke back surface 52. When an appearance of the spoke edge 54 is checked after the edge treatment, burrs generated by lathe processing have been removed, and the processed surface 55 having an R shape over the entire length has been formed. Then, by the coating process, a primer layer made of a powder coating material, a color coat layer made of a solvent coating material, and a clear coat layer made of a solvent coating material are formed in this order on the metal base of the wheel molded body 10. FIG. 9 is a photograph showing a back surface of a spoke after coating. The spoke is cut between AC on the side of the disc outer diameter and between BD on the side of the disc center shown in the photograph of FIG. 9, and a cross-sectional shape of the processed surface of the spoke edge at each portion of A, B, C, and D is observed. In addition, the film thickness of the coating film (primer layer) on the processed surface is measured. In the coating process, the coating film of the primer layer is coated with the aim of 120 µm on the front surface 51 of the spoke 5, 60 µm on the side surface 53, and 50 µm on the back surface 52 on average at each portion.

Figure 10A:
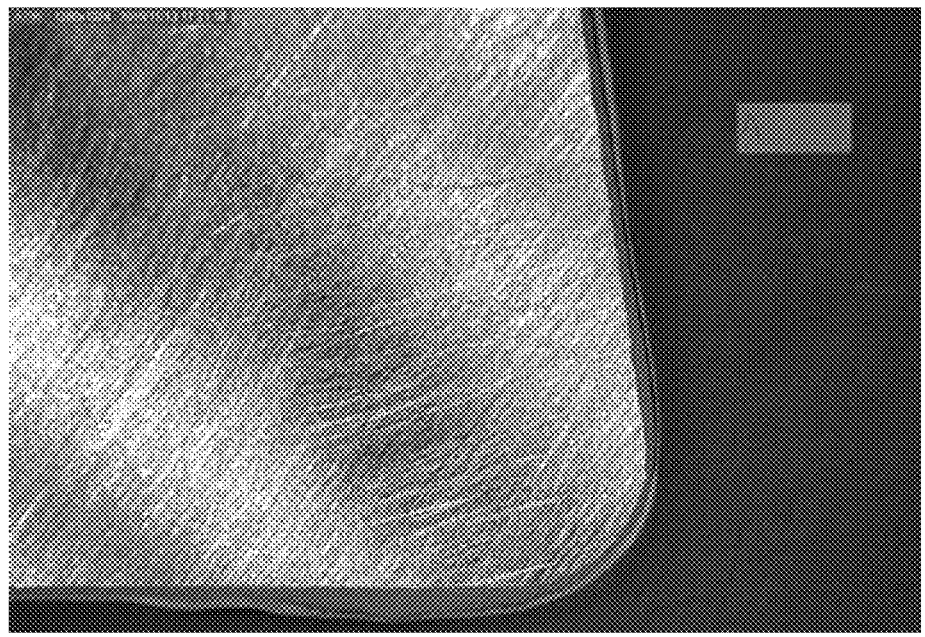
FIG. 10A is a cross-sectional photograph of the spoke edge shown in FIG. 9 at a magnification of 50 times at portion A (disc outer diameter side)
Figure 10B:
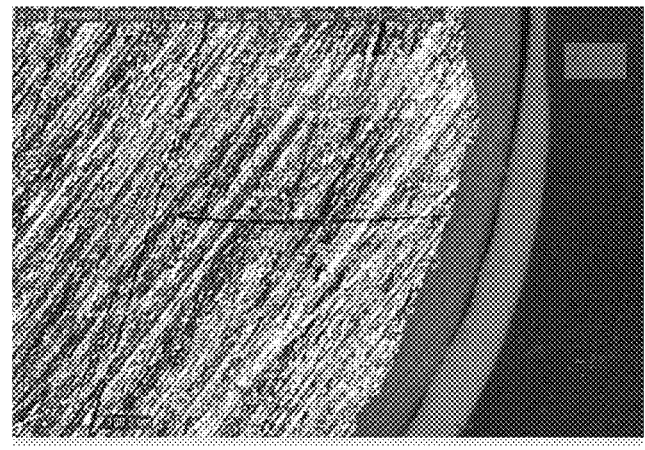
FIG. 10B is a cross-sectional photograph of the spoke edge shown in FIG. 9 at a magnification of 500 times at portion A (disc outer diameter side)
Figure 11A:
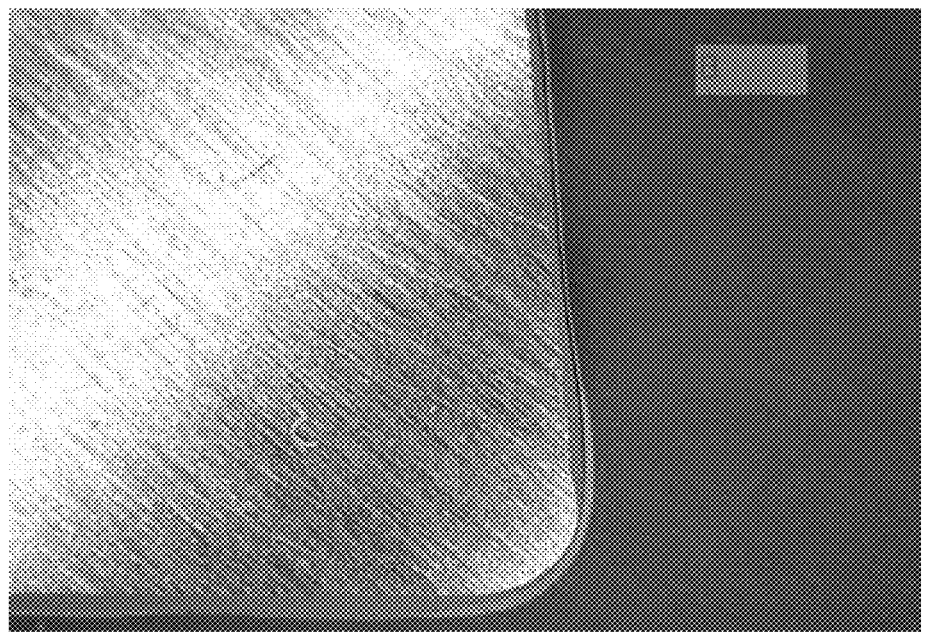
FIG. 11A is a cross-sectional photograph of the spoke edge shown in FIG. 9 at a magnification of 50 times at portion B (disc center side)
Figure 11B:
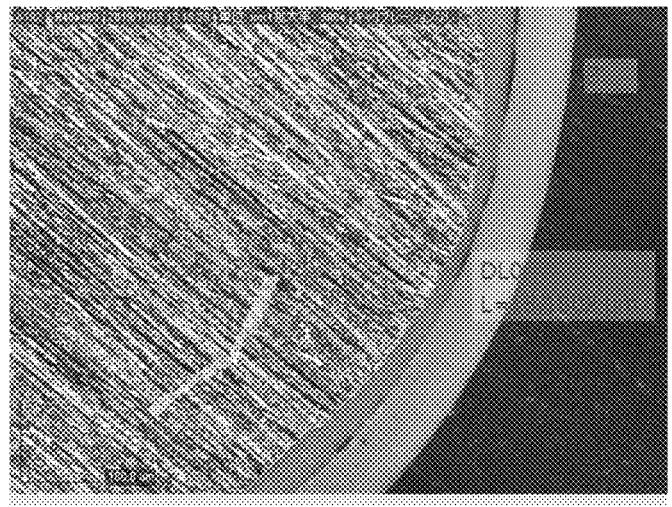
FIG. 11B is a cross-sectional photograph of the spoke edge shown in FIG. 9 at a magnification of 500 times at portion B (disc center side)
Figure 12A:
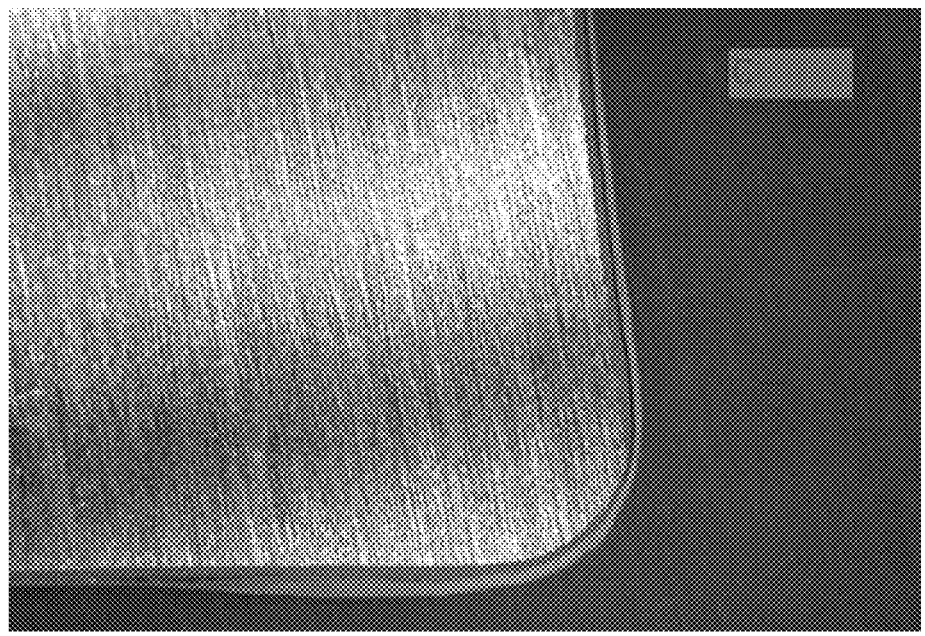
FIG. 12A is a cross-sectional photograph of the spoke edge shown in FIG. 9 at a magnification of 50 times at portion C (disc outer diameter side)
Figure 12B:
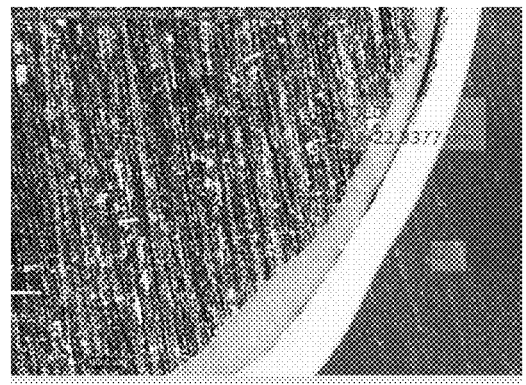
FIG. 12B is a cross-sectional photograph of the spoke edge shown in FIG. 9 at a magnification of 500 times at portion C (disc outer diameter side)
Figure 13A:
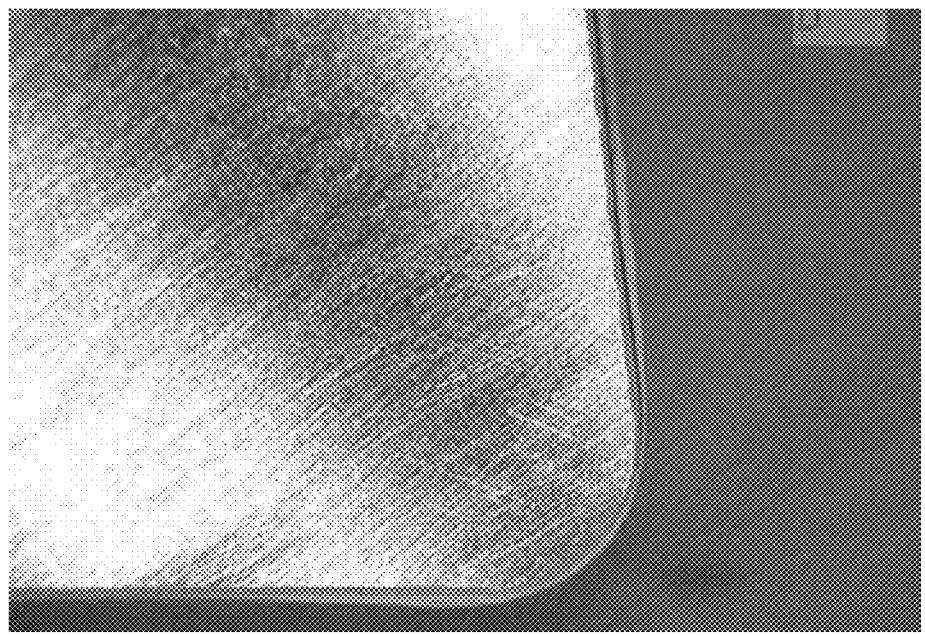
FIG. 13A is a cross-sectional photograph of the spoke edge shown in FIG. 9 at a magnification of 50 times at portion D portion (disc center side)
Figure 13B:
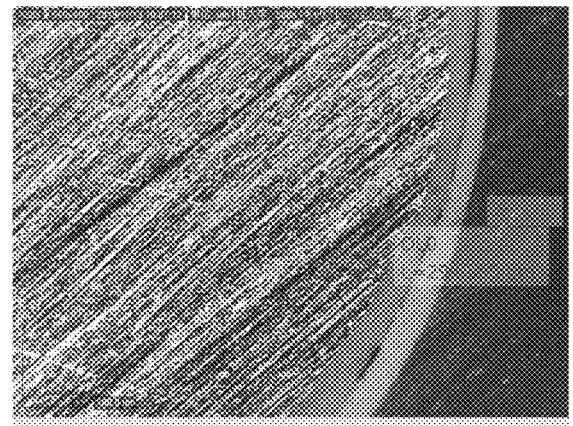
FIG. 13B is a cross-sectional photograph of the spoke edge shown in FIG. 9 at a magnification of 500 times at portion D (disc center side).

FIGS. 10A and 10B show cross-sectional photographs of portion A of the spoke edge. FIG. 10A is a cross-sectional photograph having a magnification of 50 times, and FIG. 10B is a cross-sectional photograph having a magnification of 500 times. Similar to FIGS. 10A and 10B, FIGS. 11A and 11B show cross-sectional photographs of portion B of the spoke edge, FIGS. 12A and 12B show cross-sectional photographs of portion C of the spoke edge, and FIGS. 13A and 13B show cross-sectional photographs of portion D of the spoke edge.

A and B, and C and D are spoke edge portions on the side of the same spoke side surface side, respectively. A and C are spoke edge portions on the side of the disc outer diameter, and B and D are spoke edge portions on the side of the disc center. Comparing the photographs of portion A in FIGS. 10A and 10B with the photographs of portion B in FIGS. 11A and 11B, and comparing the photographs of portion C in FIGS. 12A and 12B with the photographs of portion D in FIGS. 13A and 13B, it can be seen that a cross-sectional shape of the spoke edge processed surface on the side of the same spoke side surface has the same R shape on both the side of the disc outer diameter and the side of the disc center. From this, it is confirmed that by the edge treatment, the blade edge 83 of the hale type tool 8 is continuously moved along the ridgeline of the spoke edge for scraping with respect to the spoke edge after lathe processing, so that burrs generated by lathe processing are removed and a processed surface having a uniform R shape matching the shape of the blade edge of the hale type tool 8 is continuously formed over the entire length of the spoke edge.

In each of portions A, B, C, and D of the spoke edge, the film thickness of a bottom primer layer formed by coating is 48.0 µm in portion A, 15.2 µm in portion B, 22.3 µm in portion C, and 30.0 µm in portion D. From this, it is confirmed that the spoke edge after the edge treatment is coated over the entire length with a coating film having an appropriate film thickness of at least 7 µm as the thickness required for rust prevention performance in the bottom primer layer. In the coating process, a color coat layer and a clear coat layer are further formed on the primer layer with respect to the spoke, so that the thickness of the entire coating film at the spoke edge is equal to or greater than the film thickness of the primer layer.

Therefore, according to the present invention, at the spoke edge 54, burrs generated by lathe processing are removed, and the processed surface 55 having an R shape can be efficiently formed over the entire length with a good finishing quality and without variations as in the case of manual work. By the subsequent coating process, a final coating that secures a coating film having an appropriate film thickness can be stably provided. As a result, the spoke edge 54 is sufficiently rust-proof for a long period of time.

The present invention is not limited to the above-described embodiment, and various modifications can be made within the scope of the claims.

For example, the edge treatment can be applied to a spoke edge on a side of the spoke front surface 51.

The hale type tool 8 has the blade edge 83 of the processing blade 82 that faces the side of the base end of the shank portion 81, and the hale type tool 8 is arranged on a side of a surface (side of the front surface 51) opposite to the side of the spoke surface (side of the back surface 52) of the spoke edge 54 to be edge-treated to perform the edge treatment on the spoke edge 54. The present invention is not limited to this configuration and form, and the hale type tool 8 may have the blade edge 83 of the processing blade 82 that faces the side of the tip end of the shank portion 81. In the hale type tool 8 described above having the blade edge 83 that faces the side of the tip end, the hale type tool 8 is arranged on the side of a spoke surface (side of the front surface 51 or back surface 52) of the spoke edge 54 to be edge-treated to perform the edge treatment on the spoke edge 54.

The invention claimed is:

1. A method for manufacturing a vehicle wheel having a cylindrical rim portion for mounting a tire and a disc portion provided with pluralities of spokes and decorative holes, and both the cylindrical rim portion and the disc portion are manufactured by casting or forging, the method comprising
performing lathe processing of the disc portion, an edge treatment step including removal of burrs at a spoke edge generated by the lathe processing, and a coating step wherein
the pluralities of spokes comprise a front surface of a spoke that is an outer surface side of the vehicle wheel when the vehicle wheel is mounted on a vehicle, a back surface of the spoke that is an inner surface side of the vehicle wheel when the vehicle wheel is mounted on a vehicle, and a side surface of the spoke that is an opposing surface of the adjacent spokes forming the decorative hole,
the spoke edge is a corner portion of a boundary between the back surface and the side surface of the spoke, and a ridgeline of the corner portion has a three-dimensional linear shape according to a shape of the spoke,
during the edge treatment step, with the vehicle wheel on a fixed side, a cutting tool is disposed on a front surface side of the disc portion that does not interfere with the cylindrical rim portion, with a tip end of the cutting tool is inserted into a decorative hole, of the decorative holes, from a side of the front surface of the disc portion, and cutting the spoke edge on the back side of the spoke having the three-dimensional linear shape with a processing blade formed at the tip end of the cutting tool,
the edge treatment step comprises using the cutting tool as hale type tool for non-rotational processing having the processing blade with an R-shaped or a polygonal C-shaped recessed blade edge protruding from an outer peripheral surface on a side of the tip end of the cutting tool connected to a rod-shaped shank portion of the cutting tool, with a processing machine equipped with four or more moving axes that move each axis by computerized numerical control (CNC) based on three-dimensional shape data along the ridgeline of a three-dimensional shape of the spoke edge, the cutting tool is standing upright against a disc surface while holding a tool rotation direction angle within a range that allows transferring of a shape of the R-shaped or the polygonal C-shaped recessed blade edge of the cutting tool, the blade edge of the processing blade is applied to the spoke edge and continuously moved relative to the spoke edge along the ridgeline of the spoke edge for scraping so that burrs are removed from the spoke edge, and at the same time, a processed surface having a uniform R shape or a polygonal C shape that matches the shape of the blade edge of the cutting tool is continuously formed, and
the coating step comprises forming a coating film having a film thickness of at least 7 µm or more on the spoke edge after the edge treatment step over an entire length of the spoke edge.

2. The method for manufacturing a vehicle wheel according to claim 1, wherein
the cutting tool has two or more processing blades, comprising the processing blade, and the processing blades are formed at left and right positions orthogonal to an axis of a cutting tool portion with processing blade surfaces facing in a same direction, respectively,
during the edge treatment step, when a spoke edge on a side of the back surface of a spoke is processed, the cutting tool is relatively moved in one direction either from a side of a disc center to a side of a disc outer diameter, or from the side of the disc outer diameter to the side of the disc center, and one of the processing blades of the cutting tool processes the spoke edge on one side of left and right side surfaces of the spoke, and another one of the processing blades of the cutting tool processes the spoke edge on another side of the left and right side surfaces of the spoke.

3. The method for manufacturing a vehicle wheel according to claim 2, wherein
the vehicle wheel includes the disc portion arranged closer to an outer side of the cylindrical rim portion,
the cutting tool includes the processing blades formed at the tip end, the processing blades having the blade edge facing a side of a base end of the rod-shaped shank portion, and
during the edge treatment step, arranging the cutting tool on the front surface side of the disc portion that does not interfere with the cylindrical rim portion, holding a state where the tip end of the cutting tool is inserted into each of the decorative holes from a side of a front surface of the disc portion and processing by the blade edge of the processing blades at the tip end is applied to the spoke edge on the side of the back surface of the spoke.

4. The method for manufacturing a vehicle wheel according to claim 1, wherein
the vehicle wheel includes the disc portion arranged closer to an outer side of the cylindrical rim portion,
the cutting tool includes processing blades, comprising the processing blade, formed at the tip end, the processing blade having the blade edge facing a side of a base end of the rod-shaped shank portion, and
during the edge treatment step, arranging the cutting tool on the front surface side of the disc portion that does not interfere with the cylindrical rim portion, holding a state where the tip end of the cutting tool is inserted into each of the decorative holes from a side of a front surface of the disc portion and processing by the blade edge of the processing blade at the tip end is applied to the spoke edge on the side of the back surface of the spoke.

5. The method for manufacturing a vehicle wheel according to claim 1, wherein
the rod-shaped shank portion comprises a base end that is attached to a spindle of the processing machine, and that is formed so as to protrude from an outer peripheral surface of the tip end of the cutting tool and performs the edge treatment step on the spoke edge, the processing blade is formed with a processing blade surface, and the processing blade surface is a rake face continuous with a cutout surface formed by cutting out a tip end portion of the rod-shaped shank portion along an axial direction, a blade edge of the processing blade is formed toward a side of the base end of the rod-shaped shank portion in the processing blade, that is, when the cutting tool is placed upright with the side of the base end of the rod-shaped shank portion facing up, an upper end portion of the processing blade is the blade edge, during the edge treatment step, the tip end of the cutting tool is inserted into the decorative hole from a side of the front surface of the disc portion, so that the blade edge of the processing blade is applied to the spoke edge on the side of a spoke back surface to perform the edge treatment step.

6. The method for manufacturing a vehicle wheel according to claim 5, wherein when the vehicle wheel is placed horizontally with a side of the front surface of the disc portion facing upward, a side of a disc center of the spoke back surface forms an inclined surface that rises toward a side of a disc outer diameter and has a predetermined rising angle with respect to a horizontal line, when the processing blade surface faces the side of the disc outer diameter and the blade edge is applied to the spoke edge on the side of the spoke back surface while the cutting tool is placed vertically with respect to the disc surface, a flank which is the back surface of the processing blade has such a shape that a clearance angle equal to or greater than the predetermined rising angle of the spoke back surface is secured, when the cutting tool is inserted from the side of the front surface of the disc portion and the edge treatment step is performed on the spoke edge on the side of the spoke back surface, even when the cutting tool is held in a vertical position with respect to the disc portion, the flank of the processing blade has an inclined surface on the spoke back surface.

7. The method for manufacturing a vehicle wheel according to claim 5, wherein the cutting tool has two or more processing blades, comprising the processing blade, and the processing blades are formed at left and right positions orthogonal to an axis of a cutting tool portion with processing blade surfaces facing in a same direction, respectively, during the edge treatment, with respect to the spoke of each of two adjacent spokes forming the decorative hole, one of the two or more processing blades of the cutting tool is used to process the spoke edge of one the spoke, and the other one of the processing blades processes the spoke edge of other one the spoke.

8. The method for manufacturing a vehicle wheel according to claim 5, wherein during the edge treatment step, the cutting tool moved so as to orbit the decorative hole, with respect to the spoke edge of each of two adjacent spokes forming the decorative hole, the cutting tool is used to perform processing.

9. The method for manufacturing a vehicle wheel according to claim 5, wherein the shape of the blade edge is a polygonal C-shaped recessed shape having two or more corners, an angle at which two straight lines of the polygonal C shape intersect is set to an obtuse angle.

10. The method for manufacturing a vehicle wheel according to claim 5, wherein during the edge treatment step, the cutting tool is attached to the spindle of the processing machine, and the vehicle wheel after lathe processing is attached to a bed of the processing machine, the bed has a horizontal mounting surface, and the vehicle wheel is mounted on the bed with the side of the front surface of the disc portion facing up, the spindle is arranged above the bed, and the cutting tool attached to the spindle is arranged in an upright position with the axis oriented in a vertical direction, and after operating the processing machine and indexing the vehicle wheel so that the spoke to be processed is arranged at a tool position of the spindle, the tip end of the cutting tool is oriented with its axis in an upright position perpendicular to the disc surface and inserted into the decorative hole from the side of the front surface of the disc portion, the cutting tool is brought closer to a spoke side surface, and the blade edge of the cutting tool is abutted against the spoke edge with respect to the spoke edge on the side of the spoke back surface.

11. The method for manufacturing a vehicle wheel according to claim 10, wherein while the cutting tool is kept in a vertical position, an angle is adjusted so that the processing blade surface faces a direction of the ridgeline of the spoke edge by an angle command around the Z axis, which is the C axis, and the cutting tool is moved so that the blade edge follows the ridgeline of the spoke edge having a three-dimensional line shape by an axial position command of the XYZ axes.

* * * * *